United States Patent [19]

Lejeune

[11] 4,003,421
[45] Jan. 18, 1977

[54] VEHICLE WHEELS
[75] Inventor: Daniel Lejeune, Clermont-Ferrand, France
[73] Assignee: Compagnie Generale des Etablissements Michelin, raison sociale Michelin & Cie, Clermont-Ferrand, France
[22] Filed: Nov. 26, 1975
[21] Appl. No.: 635,307
[30] Foreign Application Priority Data
Dec. 3, 1974   France ............................ 74.40197
[52] U.S. Cl. .............................................. 152/409
[51] Int. Cl.² .......................................... B60C 5/16
[58] Field of Search ................... 301/95–98, 301/36 R, 13 R, 13 SM; 152/376, 375, 378, 396, 405, 409

[56]   References Cited
UNITED STATES PATENTS
3,448,783   6/1969   Sons .................... 152/375

Primary Examiner—Stanley H. Tollberg
Attorney, Agent, or Firm—Brumbaugh, Graves, Donohue & Raymond

[57]   ABSTRACT

A rim for tubeless tires is improved by having the outer elastic annular sealing ring housed in a groove located in a conical bearing surface of the fixed locking device forming a thickening of increasing diameter which is firmly connected with the rim base.

2 Claims, 1 Drawing Figure

U.S. Patent  Jan. 18, 1977  4,003,421
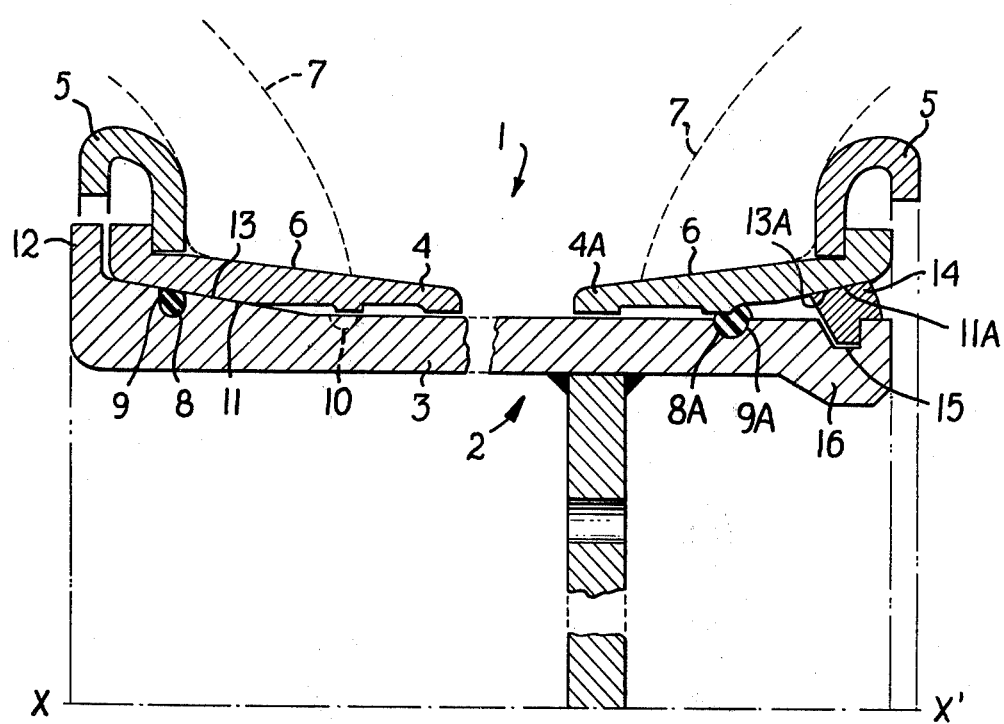

VEHICLE WHEELS

The present invention relates to improvements in wheels and more particularly to wheel rims which are intended to cooperate with tubeless tires, in order to form an airtight enclosure which can contain air under pressure.

When such rims are formed of a plurality of concentric parts, the connections between some of these parts must have sealing means.

Thus a given type of demountable rim comprises:
- a practically cylindrical rim base;
- two conical rings each having a radially outward conical face to form airtight seats for the beads of the tire, and a radially inward face having a diameter slightly greater than the diameter of the rim base in order to be able to slide on the latter;
- two flanges whether or not independent of the corresponding conical ring and each forming an extension thereof;
- two locking means, one removable and the other fixed, each of which is intended to lock a conical ring with respect to the rim base;
- between each conical ring and the rim base, a means assuring a seal.

The means assuring a seal may, for instance, be a continuous annular element of an elastic material, said element being held fast in the rim base by means of a groove provided in the latter opposite the corresponding conical ring and intended to be compressed by the radially inner face of the conical ring. Such an arrangement is described, for instance, in French Pat. No. 1,126,206.

In a variant of the type of demountable rim described above a conical bearing surface firmly connected with or integral of the rim base is provided as fixed locking device. Against this conical bearing surface of the wheel rim there rests a bearing surface of corresponding conicity provided on the conical ring.

The conical bearing surface of the rim base furthermore constitutes an extension of increasing thickness of the portion of constant thickness of the rim base. It is in this portion of constant thickness that a groove is provided intended to retain one of the seal-producing elastic elements.

Such an arrangement of the groove has drawbacks. If the constant thickness portion of the rim base is of normal thickness, the groove constitutes a substantial local weakening of the rim base. In order to overcome this weakening one can increase the thickness of the said portion of the rim base in such a manner that at the level of the said groove the said portion has a normal thickness, this at the cost of increasing the weight of the rim. Furthermore, since the dimensions of the conical ring are imposed by the beads of the tire and since the fixed locking device of the rim is customarily located on the side of the rim facing the inside of the vehicle, the thickening of this portion of the rim base narrows the radially inner space of the rim which is reserved for the passage of the wheel fastening, driving and braking members.

Finally, it has been found in practice that the sealing ring, instead of being simply compressed by the conical ring, was subjected to complex stresses as a result of the axial sliding of the conical ring along the rim base in the direction towards the stationary locking surface upon the mounting of the tire. Such stresses may damage the joint and prevent it from operating satisfactorily.

The object of the present invention is to remedy these drawbacks.

For this purpose the rim for tubeless tires in accordance with the invention has a rim base with two grooves each supporting an elastic annular sealing element, two conical rings with corresponding flanges and two locking devices for said conical rings, one of said devices being formed by a conical bearing surface forming a thickening of increasing diameter firmly connected with the rim base and by a bearing surface of suitable conicity on the corresponding conical ring, and is characterized by the fact that one of the elastic annular sealing elements is housed in a groove located intermediately in the conical bearing surface of the locking device forming a thickening of increasing diameter which is firmly connected with the rim base.

In other words, the housing groove for the elastic sealing ring is located in the thickening formed by the conical bearing surface of the fixed locking device which is firmly connected with the rim base and forms an extension of the portion of constant thickness thereof. The result is that said portion can have a normal thickness without the danger of locally weakening the rim base or of narrowing the space available on the inside of the rim. Moreover, the sealing element is essentially deformed by compression due to the parallelism between the conical bearing surface which is firmly connected with the rim base and the corresponding conical bearing surface of the conical ring.

The groove which contains the elastic sealing element is located axially near the outside of the rim and in a thickened portion of the rim base. This sealing element is less exposed to the heat coming from the wheel braking and/or driving members. As a result of the invention it is also possible to increase the surface of the cross section of the sealing element without risking weakening the resistance of the rim base. Therefore, the groove intended to receive the sealing element is located preferably in the axially outer half of the conical bearing surface which is firmly connected with the rim base, that is to say in the thicker portion of the rim base.

The drawing, a description of which follows, is intended to facilitate an understanding of the invention and shows, by way of illustration and not of limitation - a rim having a sealing element which is arranged in accordance with the invention. The central portion of this rim has been shown with a fictitious interruption.

The rim 1 comprises a rim base 2 with a cylindrical portion 3 of constant thickness. This rim 1 furthermore has two conical rings 4 and 4A with, in the example shown, two flanges 5 which are independent of these rings. Each of the conical rings 4 and 4A is provided, on its radially outer face with respect to the axis XX' of the rim, with a frustoconical surface 6 intended to form a seat for a bead 7 of a tire the rest of which has not been shown.

The rim base 2 terminates on one side in a frustoconical bearing surface 11, the diameter of which increases in the direction towards the fixed rim edge 12. This frustoconical bearing surface 11 of the rim base 2 constitutes a fixed locking device in cooperation with a corresponding frustoconical bearing surface 13 provided on the conical ring 4.

On the opposite side the rim base 2 terminates in a removable locking device comprising a locking ring 14 embedded in a groove 15 provided in the terminal portion 16 of the rim base 2. This locking ring 14 has a frustoconical bearing surface 11A which may be similar to the frustoconical bearing surface 11 terminating the rim base 2 on the same side as the fixed locking device. This frustoconical bearing surface 11A of the locking ring 14 cooperates with a corresponding frustoconical bearing surface 13A provided on the conical ring 4A.

The rim base 2 furthermore is provided in its radially outer face with two grooves 8 and 8A in each of which there is housed an elastic sealing ring 9 or 9A. On the same side as the removable locking device the groove 8A for the elastic sealing ring 9A is arranged, in manner known per se, near the terminal portion 16 of the rim base 2 in which the groove 15 is provided in which the locking ring 14 is embedded.

On the other hand, it is seen that the groove 8 which forms the housing of the elastic ring 9 located on the same side as the fixed locking device is now in accordance with the invention in the frustoconical bearing surface 11 which forms part of the fixed locking device, whereas up to the present time the seal was assured by an annular element housed in a groove 10, shown in dashed line, provided in the central portion 3 of the rim base 2.

The conical bearing surface 11 has a diameter which increases in the direction towards the rim edge 12 and thus forms a reinforcement of the rim base 2. On the one hand, the groove 8 for the elastic sealing ring 9 no longer decreases the thickness of the cylindrical portion 3 of the rim base 2; on the other hand, the elastic ring 9 is essentially compressed radially instead of being stressed both radially and tangentially.

The invention is of course independent of the amount of conicity or conicities of the frustoconical bearing surfaces 11 and 11A, on the one hand, and 13 and 13A, on the other hand, that is to say the inclination or inclinations of the said bearing surfaces with respect to the axis XX' of the rim.

It goes without saying that the invention extends to the case in which several grooves, with their corresponding sealing elements, are arranged in the frustoconical bearing surface of the fixed locking device.

What is claimed is:

1. Rim for tubeless tires having a rim base with two grooves each supporting an elastic annular sealing element, two conical rings with corresponding flanges and two locking devices for said conical rings, one of said devices being formed by a conical bearing surface forming a thickening of increasing diameter firmly connected with the rim base and by a bearing surface of suitable conicity on the corresponding conical ring, said rim being characterized by the fact that one of the elastic annular sealing elements is housed in a groove located intermediately in the conical bearing surface of the locking device forming a thickening of increasing diameter which is firmly connected with the rim base.

2. Rim according to claim 1, characterized by the fact that the groove is located in the axially outer half of the conical bearing surface.

* * * * *